US012809326B2

(12) United States Patent
Izumi et al.

(10) Patent No.: US 12,809,326 B2
(45) Date of Patent: Nov. 24, 2026

(54) INFORMATION OUTPUT METHOD, INFORMATION OUTPUT DEVICE, AND COMPUTER-READABLE RECORDING MEDIUM RECORDING A PROGRAM

(71) Applicant: Panasonic Intellectual Property Corporation of America, Torrance, CA (US)

(72) Inventors: Hiroko Izumi, Kanagawa (JP); Tatsumi Nagashima, Osaka (JP); Mitsuko Shuto, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 356 days.

(21) Appl. No.: 18/410,294

(22) Filed: Jan. 11, 2024

(65) Prior Publication Data

US 2024/0142929 A1 May 2, 2024

Related U.S. Application Data

(63) Continuation of application No. PCT/JP2022/028068, filed on Jul. 19, 2022.

(30) Foreign Application Priority Data

Jul. 29, 2021 (JP) ................................ 2021-123918

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
CPC ........ G05B 19/042; G05B 2219/25011; G05B 2219/2642; G05B 15/02; G06Q 50/16
(Continued)

(56) References Cited

U.S. PATENT DOCUMENTS 6,792,319 B1 * 9/2004 Bilger ...................... F24F 11/58 700/83
10,412,210 B2 * 9/2019 Bjontegard ............. A63F 13/32
(Continued)

FOREIGN PATENT DOCUMENTS

| | | |
|---|---|---|
| CN | 108919663 A | 11/2018 |
| JP | 2014-235706 | 12/2014 |
| WO | 2014/128801 | 8/2014 |

OTHER PUBLICATIONS

International Search Report issued Oct. 18, 2022 in International (PCT) Application No. PCT/JP2022/028068.

*Primary Examiner* — Jaime Figueroa
(74) *Attorney, Agent, or Firm* — Wenderoth, Lind & Ponack, L.L.P.

(57) ABSTRACT

An information processing apparatus acquires first relevance information indicative of a relevance between space identification information identifying a space in a building and device-installation information that is indicative of a device or an installation and associated with the space identification information; acquires modification information for modifying an association between the space identification information and the device-installation information in the first relevance information; generates second relevance information indicative of a new association between the space identification information and the device-installation information on the basis of the modification information; and outputs the second relevance information.

12 Claims, 14 Drawing Sheets

(58) Field of Classification Search
USPC .............................................................. 700/83
See application file for complete search history.

(56) References Cited

U.S. PATENT DOCUMENTS

| | | | | |
|---|---|---|---|---|
| 2004/0148632 | A1* | 7/2004 | Park | H04N 5/765 348/E5.103 |
| 2007/0197236 | A1* | 8/2007 | Ahn | H04L 12/2825 455/466 |
| 2008/0180228 | A1* | 7/2008 | Wakefield | G08C 17/02 340/4.62 |
| 2009/0316671 | A1* | 12/2009 | Rolf | H04W 4/029 370/338 |
| 2012/0291068 | A1* | 11/2012 | Khushoo | H04L 12/282 725/38 |
| 2014/0167931 | A1* | 6/2014 | Lee | H04L 12/2818 340/12.5 |
| 2015/0033136 | A1 | 1/2015 | Sasaki et al. | |
| 2016/0147919 | A1 | 5/2016 | Yabe et al. | |
| 2019/0171171 | A1* | 6/2019 | Verteletskyi | H04W 4/33 |
| 2019/0209022 | A1* | 7/2019 | Sobol | A61B 5/02055 |
| 2019/0349213 | A1* | 11/2019 | Shive | G05B 15/02 |
| 2021/0218571 | A1* | 7/2021 | Ansari | H04M 15/705 |
| 2021/0325189 | A1* | 10/2021 | Faustino | G01C 21/206 |

* cited by examiner

FIG.4

64A

| SPACE ID | SPACE NAME | DEVICE-INSTALLATION ID | DEVICE-INSTALLATION NAME |
|---|---|---|---|
| X11 | LIVING ROOM | A01 | AIR CONDITIONER |
| | | A02 | TELEVISION |
| | | A03 | MAIN LIGHT |
| | | A04 | INDIRECT LIGHT |
| | | A05 | SOFA |
| X12 | DINING ROOM | A06 | AIR CONDITIONER |
| | | A07 | LIGHT |
| | | A08 | DINING TABLE |
| X13 | KITCHEN | A09 | REFRIGERATOR |
| | | A10 | STOVE |
| | | A11 | OVEN |
| | | A12 | LIGHT |

•
•
•

FIG.7

64B

| SPACE ID | SPACE NAME | DEVICE-INSTALLATION ID | DEVICE-INSTALLATION NAME |
|---|---|---|---|
| Y1 | LIVING-DINING ROOM | A01 | AIR CONDITIONER |
| | | A02 | TELEVISION |
| | | A03 | MAIN LIGHT |
| | | A04 | INDIRECT LIGHT |
| | | A05 | SOFA |
| | | A06 | AIR CONDITIONER |
| | | A07 | LIGHT |
| | | A08 | DINING TABLE |
| X13 | KITCHEN | A09 | REFRIGERATOR |
| | | A10 | STOVE |
| | | A11 | OVEN |
| | | A12 | LIGHT |

•
•
•

INFORMATION OUTPUT METHOD, INFORMATION OUTPUT DEVICE, AND COMPUTER-READABLE RECORDING MEDIUM RECORDING A PROGRAM

TECHNICAL FIELD

The present disclosure relates to an information output method, an information output apparatus, and a computer-readable recording medium recording a program.

BACKGROUND ART

Patent Literature 1 discloses a technique of listing respective icons indicative of a plurality of devices disposed in a building for each room on a display to thereby allow control of operation of each device via each icon.

However, no consideration can be seen to easily modify a relevance between the rooms and the devices in accordance with the lifestyle of a user. It is necessary to perform the initial setting again in order to modify the relevance.

CITATION LIST

Patent Literature

Patent Literature 1: International Unexamined Patent Publication WO 2014/128801

SUMMARY OF INVENTION

An object of the present disclosure is to provide an information output method, an information output apparatus, and a computer-readable recording medium recording a program that enable an easy modification to relevance information including a relevance between a space and a device or an installation.

Means for Solving the Problems

An information output method according to a feature of the present disclosure, by an information processing apparatus, includes: acquiring first relevance information indicative of a relevance between space identification information identifying a space in a building and device-installation information that is indicative of a device or an installation and associated with the space identification information; acquiring modification information for modifying an association between the space identification information and the device-installation information in the first relevance information; generating second relevance information indicative of a new association between the space identification information and the device-installation information on the basis of the modification information; and outputting the second relevance information.

BRIEF DESCRIPTION OF DRAWINGS

FIG. 4 is a diagram briefly showing an example of first relevance information.

FIG. 7 is a diagram briefly showing an example of second relevance information.

DESCRIPTION OF EMBODIMENTS

Underlying Findings for Present Disclosure

Figure 1:
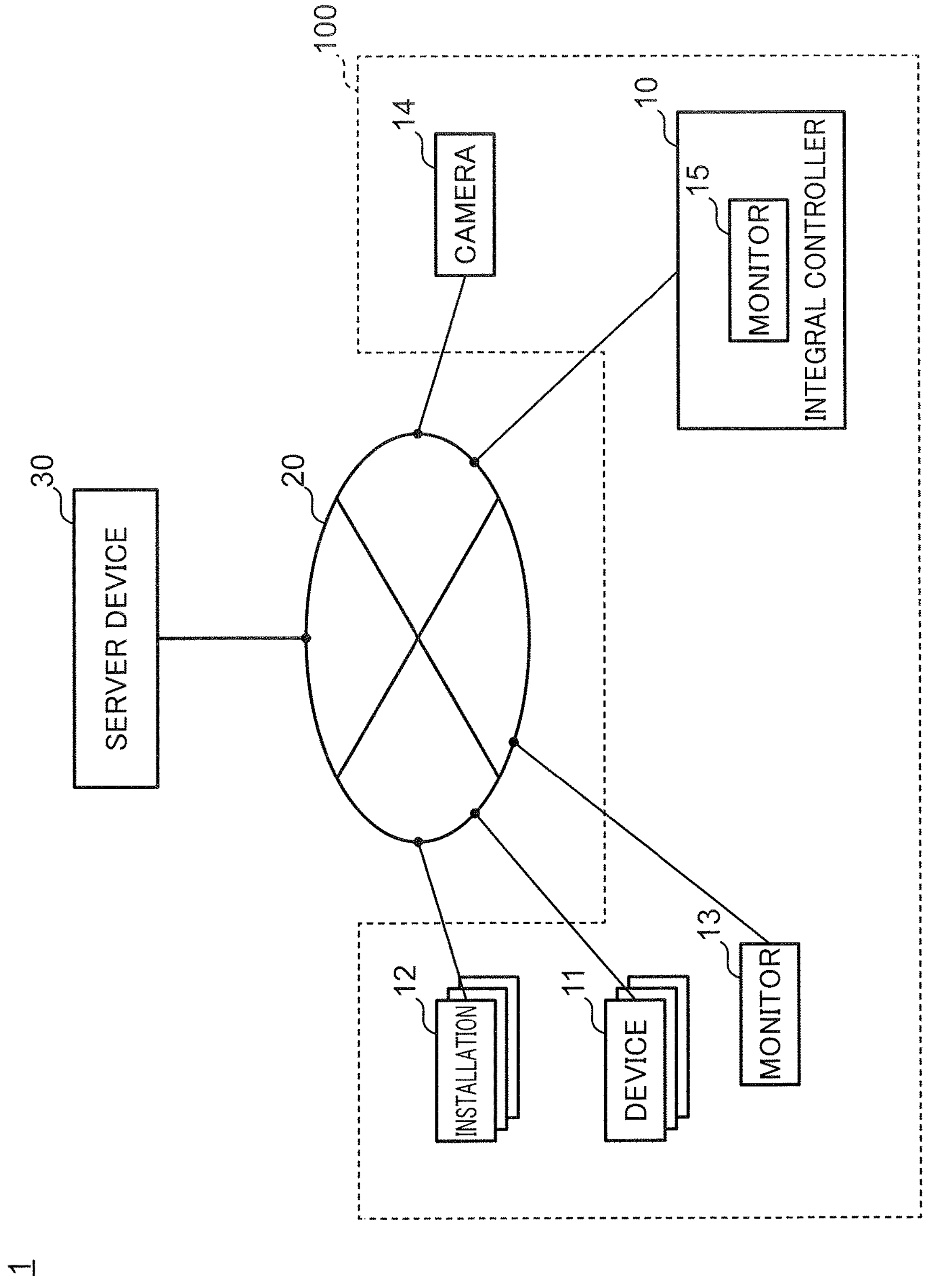
FIG. 1 is a diagram showing a whole structure of a home control system according to a first embodiment.

There exists a technique of controlling operation of a device or an installation disposed in each of a plurality of spaces in a building through an integral controller. The integral controller displays a control screen for a device or an installation in each space on the basis of relevance information including a relevance between a space and a device or an installation disposed in the space. The relevance information is input by an operator or a user when a system is installed and the initial setting is performed.

There is a case that a user hopes to modify a relevance between a space and a device or an installation indicated by relevance information input at an initial setting in accordance with, e.g., a change of the lifestyle of the user. In the background art, however, there has not been a system that allows an easy modification to the relevance. Therefore, it is necessary to perform the initial setting again in order to modify the relevance, which makes the modifying operation complicated.

To solve the above-mentioned problems, the present inventors found that relevance information can be easily modified by creating modification information including a modification for relevance information through an operation by a user and inputting the modification information to an information processing apparatus so that the information processing apparatus modifies the relevance information on the basis of the modification information, thus working out the present disclosure.

Next, embodiments of the present disclosure will be described.

An information output method according to a first feature of the present disclosure, by an information processing apparatus, includes: acquiring first relevance information indicative of a relevance between space identification information identifying a space in a building and device-installation information that is indicative of a device or an installation and associated with the space identification information; acquiring modification information for modifying an association between the space identification information and the device-installation information in the first relevance information; generating second relevance information indicative of a new association between the space identification information and the device-installation information on the basis of the modification information; and outputting the second relevance information.

The first feature enables an easy modification based on the modification information to the first relevance information indicative of the relevance between the space identification information identifying the space and the device-installation information indicative of the device or the installation disposed in the space.

With an information output method according to a second feature of the present disclosure, in the first feature, the modification information may concern a unification of two or more pieces of space identification information included in the first relevance information into one piece of space identification information, and in the generation of the second relevance information, first device-installation information associated with first space identification information in the first relevance information and second device-installation information associated with second space identification information in the first relevance information may be associated with third space identification information in the second relevance information.

The second feature enables a unification as the modification of two or more pieces of space identification information included in the first relevance information into one piece of space identification information.

With an information output method according to a third feature of the present disclosure, in the first feature, the modification information may concern a change of an association of the device-installation information with from one space identification information to another space identification information in the first relevance information, and in the generation of the second relevance information, first space identification information associated with first device-installation information in the first relevance information may be associated with second space identification information in the second relevance information.

The third feature enables a change as the modification of the space identification information with which the first device-installation information is associated in the first relevance information, from the first space identification information to the second space identification information.

With an information output method according to a fourth feature of the present disclosure, in the first feature, the modification information may concern a separation of one piece of space identification information included in the first relevance information into a plurality of pieces of space identification information, and in the generation of the second relevance information, first device-installation information and second device-installation information associated with first space identification information in the first relevance information may be associated with second space identification information and third space identification information in the second relevance information, respectively.

The fourth feature enables a separation as the modification of one piece of space identification information included in the first relevance information into a plurality of pieces of space identification information.

An information output method according to a fifth feature of the present disclosure may, in any one of the first to fourth features, further include: outputting image information for displaying an image on a display screen, wherein in the output of the image information, the image information for changing a display state of device-installation information relevant to the modification information from a first state to a second state on the display screen may be output.

In the fifth feature, the display state on the display screen is changed, which enables the user to recognize the device-installation information relevant to the modification information.

With an information output method according to a sixth feature of the present disclosure, in the fifth feature, the first state may be a normal display state of a graphic representing the device-installation information, and the second state may be an emphasis display state of the graphic representing the device-installation information.

The sixth feature enables the user to recognize the device-installation information relevant to the modification information more accurately.

An information output method according to a seventh feature of the present disclosure may, in any one of the first to fourth features, further include outputting control information for changing an operational state of a device or an installation relevant to the modification information from a first state to a second state.

The seventh feature enables the user to recognize the device or installation relevant to the modification information through the change of the operational state.

With an information output method according to an eighth feature of the present disclosure, in the seventh feature, the first state may be one of power-on and power-off operational states of the device or installation, and the second state may be the other of the power-on and power-off operational states of the device or installation.

The eighth feature enables the user to recognize the device or installation relevant to the modification more accurately.

An information output method according to a ninth feature of the present disclosure may, in any one of the first to eighth features, further include outputting a recommendation notification indicative of a recommendable modification to the first relevance information when acquiring the modification information.

In the ninth feature, a recommendation notification is output. Thus, a desirable modification can be notified to the user.

An information output method according to a tenth feature of the present disclosure may, in any one of the first to ninth features, further include outputting a non-recommendation notification indicating that the modification information is not recommendable, when the modification information is acquired and a modification is not recommendable.

In the tenth feature, a non-recommendation notification is output. This enables a notification to the user that a modification is undesirable.

With an information output method according to an eleventh feature of the present disclosure, in any one of the first to tenth features, time information indicative of a time when the first relevance information was previously modified may be kept, and in a case that a time difference between a time of the acquisition of the modification information and the time when the first relevance information was previously modified is less than a predetermined value, a confirmation notice as to whether or not to modify the first relevance information may be further output.

The eleventh feature can resolve the discrepancy in the settings between, e.g., a plurality of users living together in the same house.

With an information output method according to a twelfth feature of the present disclosure, in any one of the first to tenth features, user information indicative of a user that previously modified the first relevance information may be kept, and in a case that a user currently inputting the modification information is different from the user that previously modified the first relevance information, a confirmation notice as to whether or not to modify the first relevance information may be further output.

The twelfth feature can resolve the discrepancy in the settings between, e.g., a plurality of users living together in the same house.

With an information output method according to a thirteenth feature of the present disclosure, in any one of the first to tenth features, frequency information indicative of use frequency for each user in connection with the first relevance information may be kept, and in a case that there is a user who has a higher use frequency than a user inputting the modification information, a confirmation notice as to whether or not to modify the first relevance information may be further output.

The thirteenth feature can resolve the discrepancy in the settings between, e.g., a plurality of users living together in the same house.

An information output apparatus according to a fourteenth feature of the present disclosure includes: an acquisition part for acquiring first relevance information indicative of a relevance between space identification information identifying a space in a building and device-installation information that is indicative of a device or an installation and associated with the space identification information, and modification information for modifying an association between the space identification information and the device-installation information in the first relevance information; a generation part for generating second relevance information indicative of a new association between the space identification information and the device-installation information on the basis of the modification information; and an output part for outputting the second relevance information.

The fourteenth feature enables an easy modification based on the modification information to the first relevance information indicative of the relevance between the space identification information identifying the space and the device-installation information indicative of the device or the installation disposed in the space.

A computer-readable recording medium recording a program according to a fifteenth feature of the present disclosure causes an information processing apparatus to serve as: acquisition means for acquiring first relevance information indicative of a relevance between space identification information identifying a space in a building and device-installation information that is indicative of a device or an installation and associated with the space identification information, and modification information for modifying an association between the space identification information and the device-installation information in the first relevance information; generation means for generating second relevance information indicative of a new association between the space identification information and the device-installation information on the basis of the modification information; and output means for outputting the second relevance information.

The fifteenth feature enables an easy modification based on the modification information to the first relevance information indicative of the relevance between the space identification information identifying the space and the device-installation information indicative of the device or the installation disposed in the space.

This disclosure can be realized as: a program for causing a computer to execute each distinctive feature included in such a method or an apparatus; or a system operated by the program. Additionally, it goes without saying that the program is distributable as a non-transitory computer readable storage medium like a CD-ROM, or distributable via a communication network like the Internet.

Embodiments of Present Disclosure

Embodiments of the present disclosure will be described below with reference to the drawings. The elements given the same reference numerals in different drawings are defined to be the same or like elements. Constituent elements, dispositions thereof, connections between them, and the order of operations described below are mere examples, and thus should not be construed to delimit the disclosure. Only the claims delimit the present disclosure. Hence, constituent elements which are not recited in the independent claims each showing the broadest concept among the constituent elements in the embodiments are described as being ones not necessarily required to accomplish the object of the present disclosure but required to achieve preferable configurations.

First Embodiment

FIG. 1 is a diagram showing a whole structure of a home control system 1 according to a first embodiment of the present disclosure. The home control system 1 includes an integral controller 10, a plurality of devices 11 and a plurality of installations 12, a monitor 13, and a camera 14, which are disposed in a smart home 100. The home control system 1 also includes a server device 30. Only one smart home 100 is shown in FIG. 1 for a brief explanation, but a plurality of smart homes 100 may be included. The present disclosure can be applied to a house such as a smart home 100, and to an indoor facility, e.g., an office, a restaurant, a hotel, or a commercial facility, but is not limited to the indoor facility and can be applied to a space having both an indoor space and an outdoor space.

The smart home 100 has a plurality of spaces in which the devices 11 and the installations 12 are disposed. The space means an extensive place. The space in the present disclosure means not only a plane region in a floor plan but also an extent in a vertical direction and a location that is defined by a structural member such as a wall or a partition and has an adjacent space. The space includes, for example, a hall, a great hall, a banquet hall, a room, a habitable room, a bathroom, a toilet, an entrance, and a corridor. The devices 11 include an electronic device, e.g., a home appliance. The electronic device includes IoT devices, e.g., a washing machine, an air conditioner, a TV, a refrigerator, a rice cooker, a microwave oven, and a light. The installations 12 include an appliance or furniture used in a location where it is provided.

In the smart home 100, the monitor 13 and the camera 14 are disposed. The monitor 13 is an LCD or an organic EL display. The monitor 13 is disposed in a certain space of the smart home 100. The camera 14 captures a state where a user living in the smart home 100 uses the integral controller 10.

The smart home 100 includes an integral controller 10 for remotely controlling a device 11 and an installation 12 that are the control target among the devices 11 and the installations 12. The integral controller 10 can perform mutual data communication with a device 11 and an installation 12 that are the control target through a communication network 20 such as a public network (or a wireless LAN). The integral controller 10 has a monitor 15 such as an LCD or an organic EL display. The integral controller 10 can accept data input by the user through a touchscreen monitor 15 or by a button. Information presentation to the user and data input by the user may be performed through a communication terminal of the user such as a smartphone, after registration of the communication terminal.

The server device 30 is a cloud server or an edge server and manages the whole of the home control system 1. The server device 30 can perform mutual data communication with the integral controller 10, the devices 11, the installations 12, the monitor 13, and the camera 14 through the communication network 20. The functions of the server device 30 may be included in the integral controller 10.

Figure 2:
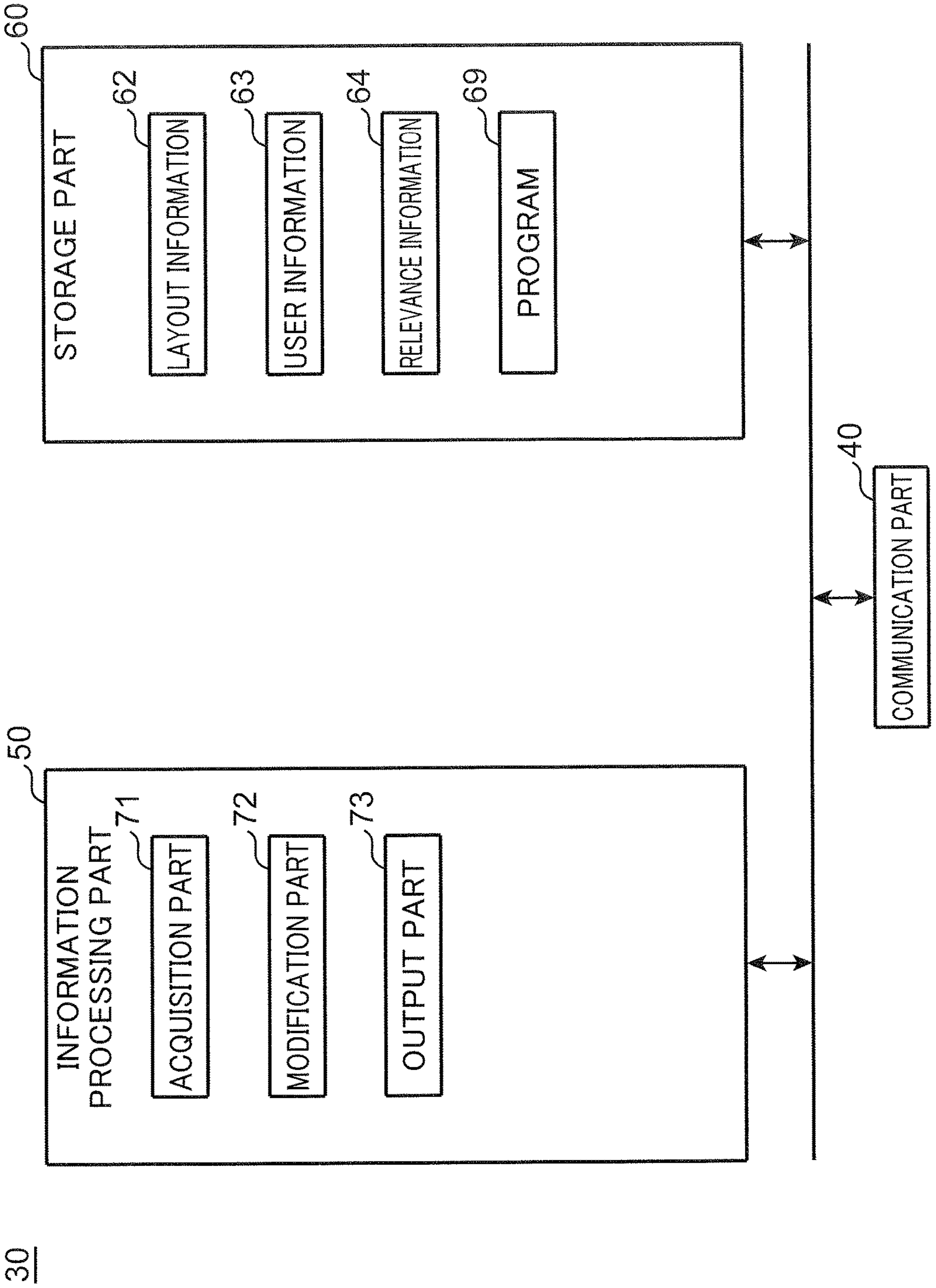
FIG. 2 is a diagram briefly showing a structure of a server device.

FIG. 2 is an illustration briefly showing a structure of the server device 30. The server device 30 includes a communication part 40, an information processing part 50, and a storage part 60.

The communication part 40 includes a communication module compatible with a communication system such as an IP.

The storage part 60 includes, for example, an HDD, an SSD, or a flash memory. The storage part 60 stores layout information 62, user information 63, relevance information 64, and a program 69. The layout information 62 is information indicative of the layout of the spaces (e.g., a room, a corridor) of the smart home 100, e.g., CAD data of a blueprint or a floor plan of the smart home 100. The user information 63 indicates a user living in the smart home 100. In a case that a plurality of users lives in the smart home 100, respective user IDs that enable identification of the users are given. The relevance information 64 indicates a relevance between each space of the plurality of spaces of the smart home 100 and a device or an installation disposed in each space, and the details thereof will be described later.

The information processing part 50 includes an acquisition part 71, a modification part 72 (generation part), and an output part 73, which are established by causing a CPU to execute the program 69 read in a ROM or a RAM from the storage part 60. In other words, the program 69 causes the information processing part 50 provided in the server device 30 serving as the information output apparatus to serve as these processing parts. The acquisition part 71 acquires first relevance information 64A from the storage part 60. The first relevance information 64A is unmodified relevance information 64. The acquisition part 71 also acquires modification information including a modification to the relevance information 64 from the integral controller 10 through the communication network 20 and the communication part 40. The modification part 72 modifies the first relevance information 64A on the basis of the modification information to thereby generate second relevance information 64B. The second relevance information 64B is modified relevance information 64. The output part 73 outputs the second relevance information 64B. The second relevance information 64B output by the output part 73 is stored in the storage part 60, and transmitted to the integral controller 10 through the communication part 40 and the communication network 20.

Figure 3:
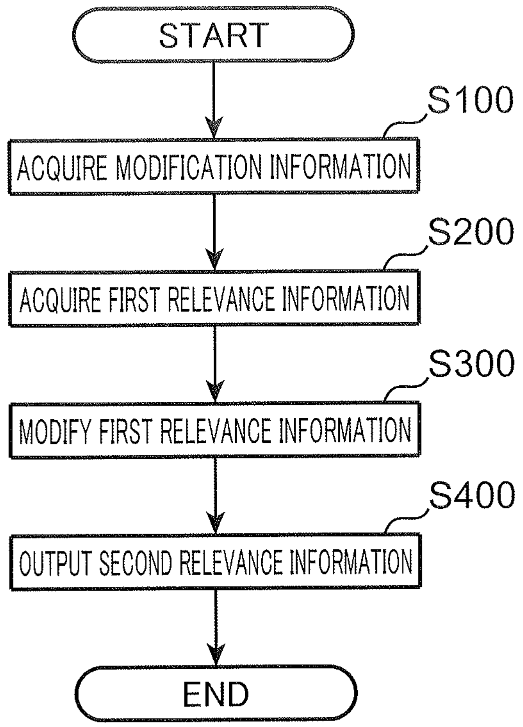
FIG. 3 is a flowchart briefly showing a flow of a process executed by an information processing part.

FIG. 3 is a flowchart briefly showing a flow of a process executed by the information processing part 50. First, in Step S100, the acquisition part 71 acquires modification information including a modification to the relevance information 64 from the integral controller 10 through the communication network 20 and the communication part 40. Next, in Step S200, the acquisition part 71 acquires first relevance information 64A, which is unmodified relevance information 64, from the storage part 60. Next, in Step S300, the modification part 72 modifies the first relevance information 64A acquired in Step S200 into second relevance information 64B on the basis of the modification information acquired in Step S100. In other words, the modification part 72 generates second relevance information 64B indicative of a new association between space identification information and device-installation information on the basis of the modification information. The second relevance information 64B is modified relevance information 64. Next, in Step S400, the output part 73 outputs the second relevance information 64B. The second relevance information 64B output by the output part 73 is stored in the storage part 60, and transmitted to the integral controller 10 through the communication part 40 and the communication network 20. The proceeding in each step will be described later.

FIG. 4 is a diagram briefly showing an example of first relevance information 64A. The first relevance information 64A indicates a relevance between space identification information such as a space ID allotted to each of the spaces of the smart home 100, a space name of each space, device-installation information such as a device-installation ID allotted to a device 11 or an installation 12 disposed in each space, and a name (device-installation name) of a device 11 or an installation 12. For example, the living room with the space ID of X11 is indicated to be provided with an air conditioner with the device-installation ID of A01, a television with A02, a main light with A03, an indirect light with A04, and a sofa with A05. The dining room with the space ID of X12 is indicated to be provided with an air conditioner with the device-installation ID of A06, a light with A07, and a dining table with A08. The kitchen with the space ID of X13 is indicated to be provided with a refrigerator with the device-installation ID of A09, a stove with A10, an oven with A11, and a light with A12.

In the embodiment, three patterns of modifications based on the substance of modification to the first relevance information 64A are available, which are unification, change, and separation. The unification is to unify two or more spaces covered by the first relevance information 64A into a space in the second relevance information 64B. The change is to change a space associated with a device 11 or an installation 12 in the first relevance information 64A from the space to another space in the second relevance information 64B. The separation is to separate a space covered by the first relevance information 64A into a plurality of spaces in the second relevance information 64B. The way of modification is not limited to the examples above, and may include another way, e.g., deletion. The deletion is to delete a device 11 or an installation 12 associated with a space in the first relevance information 64A for the second relevance information 64B.

Figure 5:
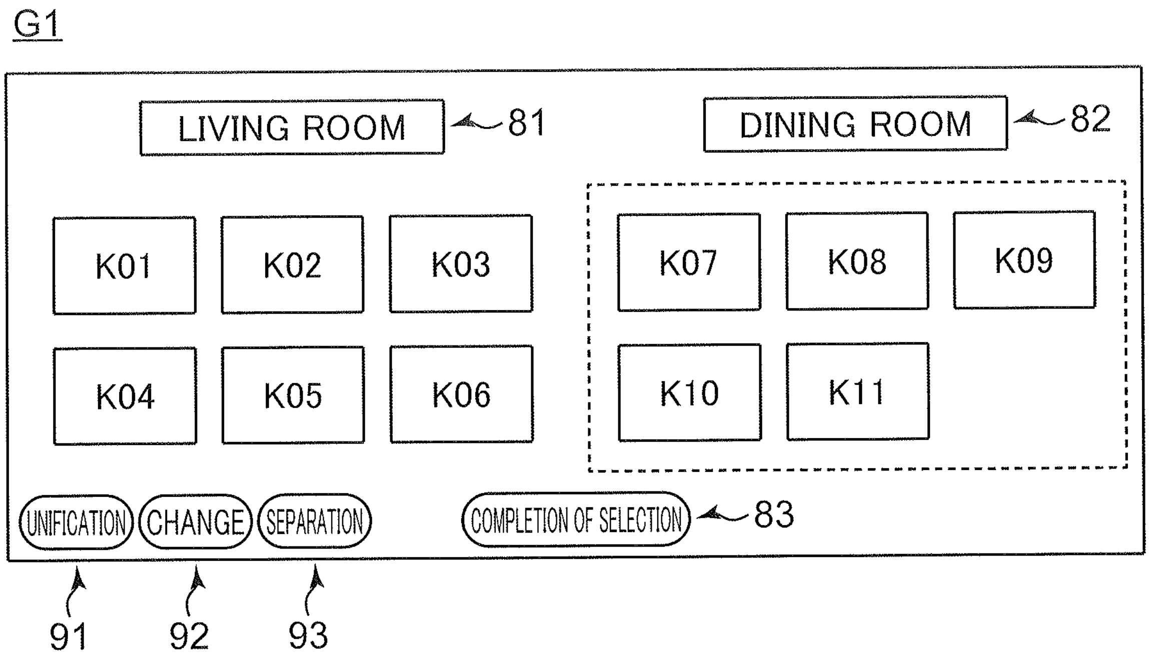
FIG. 5 is an illustration briefly showing an exemplary input screen for generating modification information for a unification.
Figure 6:
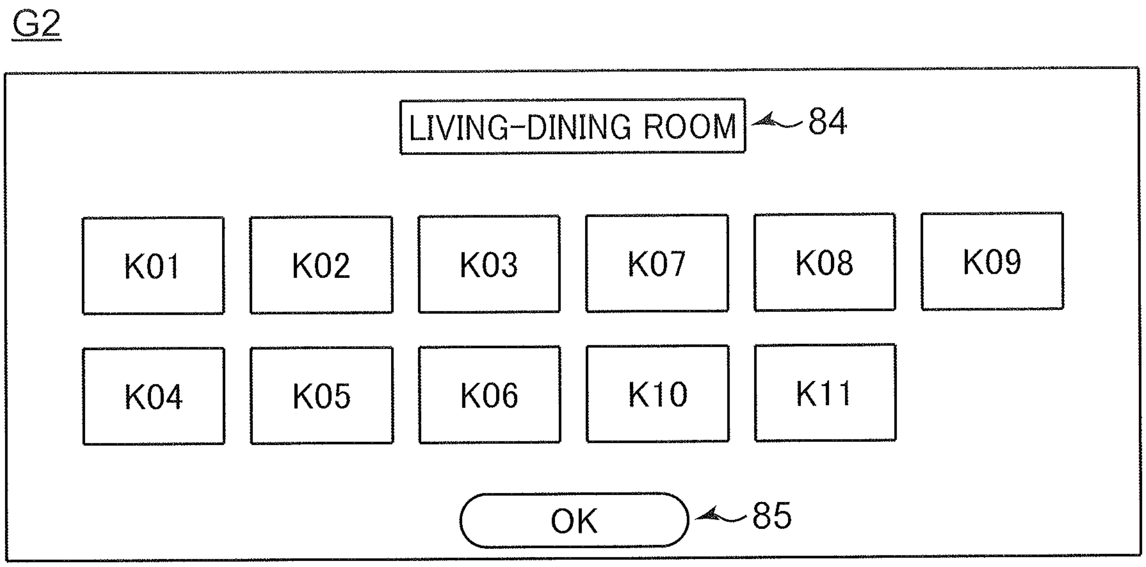
FIG. 6 is an illustration briefly showing an exemplary input screen for generating the modification information for the unification.

FIGS. 5, 6 are illustrations briefly showing exemplary input screens G1, G2 for generating modification information for a unification, respectively. The modification part 72 of the server device 30 generates image data for the input screens G1, G2, and which is transmitted to the integral controller 10 through the communication part 40 and the communication network 20. The input screens G1, G2 are displayed on the monitor 15 of the integral controller 10. The user touches the input screens G1, G2 to thereby generate modification information.

With reference to FIG. 5, the input screen G1 shows icons K01 to K06 indicative of a device 11 or an installation 12 associated with the living room below an icon 81 indicative of the living room on the basis of the first relevance information 64A. The device 11 or the installation 12 indicated by the icons K01 to K06 agrees with a device 11 or an installation 12 assigned with a device-installation ID (A01 to A05) associated with the living room in the first relevance information 64A. Below an icon 82 indicative of the dining room, there are shown icons K07 to K11 indicative of a device 11 or an installation 12 associated with the dining room. The device 11 or the installation 12 indicated by the icons K07 to K11 agrees with a device 11 or an installation 12 assigned with a device-installation ID (A06 to A08) associated with the dining room in the first relevance information 64A.

The input screen G1 shows an icon 91 indicative of the unification, an icon 92 indicative of the change, and an icon 93 indicative of the separation. The input screen G1 also shows an icon 83 indicative of completion of selection.

After tapping the icon 91 indicative of the unification, the user selects a plurality of spaces (in this example, the living room and the dining room) to be unified and taps the icon 82 indicative of the dining room. The integral controller 10 thereby changes the display state of the icons K07 to K11 indicative of the device 11 or the installation 12 associated with the dining room from normal display to emphasis display. The normal display is, for example, monochrome display, and the emphasis display is, for example, color display. Alternatively, the normal display is, for example, lighting display, and the emphasis display is, for example, blinking display. This enables the user to visually recognize the device 11 or the installation 12 relevant to the modification more accurately. When the user taps the icon 83 indicative of completion of selection, the integral controller 10 switches the input screen G1 to the input screen G2.

The input screen G2 shows, below an icon 84 indicative of a living-dining room which is a space resulting from the unification of the living room and the dining room, the icons K01 to K11 indicative of the device 11 or the installation 12 associated with the living-dining room. The modification part 72 or the integral controller 10 infers the name of a new space after the unification from a function or use of the device 11 or the installation 12 disposed in the new space. Alternatively, the modification part 72 or the integral controller 10 may present candidates for the name of the new space and allow the user to select one. Alternatively, the modification part 72 or the integral controller 10 may allow the user to input the name of the new space by text. The input screen G2 shows an icon 85 indicative of completion of confirmation (OK). When the user taps the icon 85 indicative of completion of confirmation, the integral controller 10 finalizes the substance of the unification and transmits modification information indicative of the finalized substance to the server device 30 through the communication network 20. The modification information is acquired by the acquisition part 71. The modification information includes information indicative of a relevance between the name of the new space after the unification and the device 11 or the installation 12 disposed in the new space.

The modification part 72 unifies the living room (first space) and the dining room (second space) in the first relevance information 64A on the basis of the modification information acquired by the acquisition part 71 to thereby define a living-dining room (third space) in the second relevance information 64B.

FIG. 7 is a diagram briefly showing an example of second relevance information 64B. Since the living room and the dining room in the first relevance information 64A are unified, the living-dining room with the space ID of Yl is associated with the air conditioner with the device-installation ID of A01, the television with A02, the main light with A03, the indirect light with A04, the sofa with A05, the air conditioner with A06, the light with A07, and the dining table with A08 in the second relevance information 64B.

Figure 8:
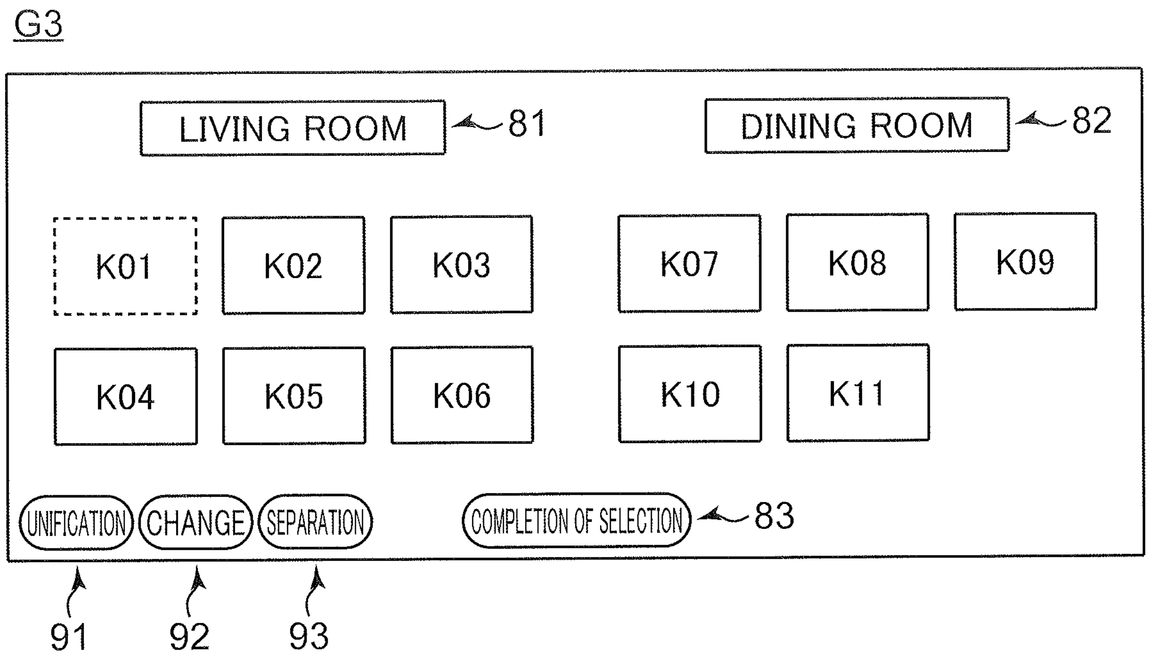
FIG. 8 is an illustration briefly showing an exemplary input screen for generating modification information for a change.
Figure 9:
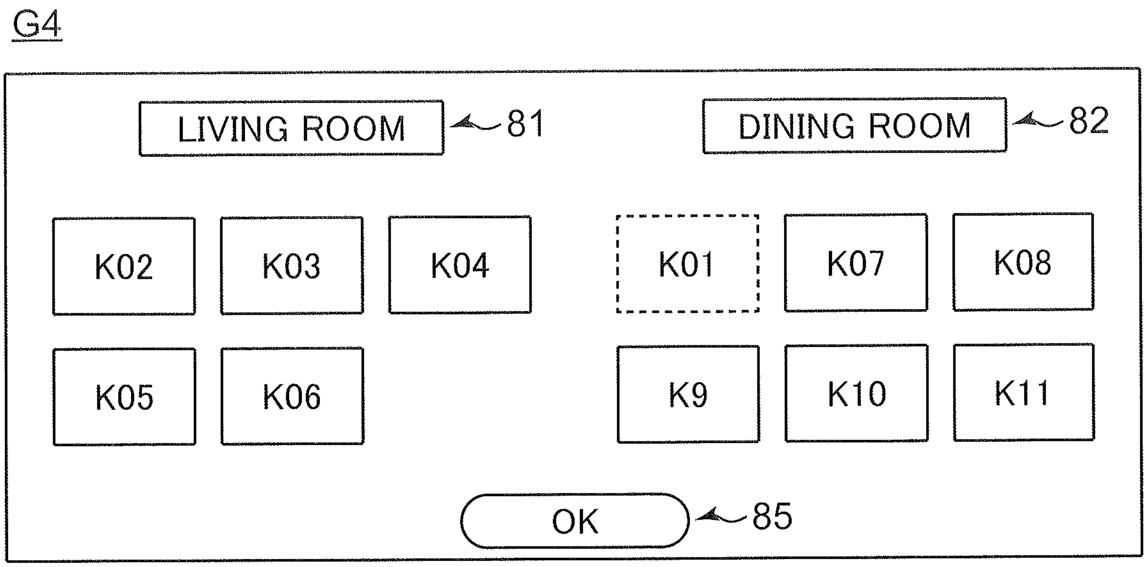
FIG. 9 is an illustration briefly showing an exemplary input screen for generating the modification information for the change.

FIGS. 8, 9 are illustrations briefly showing exemplary input screens G3, G4 for generating the modification information for the change, respectively. The modification part 72 of the server device 30 generates image data for the input screens G3, G4, and which is transmitted to the integral controller 10 through the communication part 40 and the communication network 20. The input screens G3, G4 are displayed on the monitor 15 of the integral controller 10. The user touches the input screens G3, G4 to thereby generate modification information.

With reference to FIG. 8, the input screen G3 shows the icons 81 to 83, 91 to 93, and K01 to K11, similarly to the input screen G1 shown in FIG. 5.

After tapping the icon 92 indicative of the change, the user selects a space (in this example, the living room) including a device 11 or an installation 12 to be shifted and a space (in this example, the dining room) which is under the change, and taps the icon K01 indicative of the device 11 or the installation 12 to be shifted. The integral controller 10 thereby changes the display state of the icon K01 from normal display to emphasis display. When the user taps the icon 83 indicative of completion of selection, the integral controller 10 switches the input screen G3 to the input screen G4.

In the input screen G4, the icon K01, shifted from below the icon 81 indicative of the living room to below the icon 82 indicative of the dining room, is displayed. When the user taps the icon 85 indicative of completion of confirmation, the integral controller 10 finalizes the substance of the change and transmits modification information indicative of the finalized substance to the server device 30 through the communication network 20. The modification information is acquired by the acquisition part 71. The modification information includes information indicative of a relevance between the name of each of the spaces that is the origin for the change and the destination for the change, and the device 11 or the installation 12 disposed in the respective spaces after the change.

The modification part 72 associates the device 11 or the installation 12 corresponding to the icon K01 associated with the living room (first space) in the first relevance information 64A with the dining room (second space) in the second relevance information 64B, on the basis of the modification information acquired by the acquisition part 71.

Figure 10:
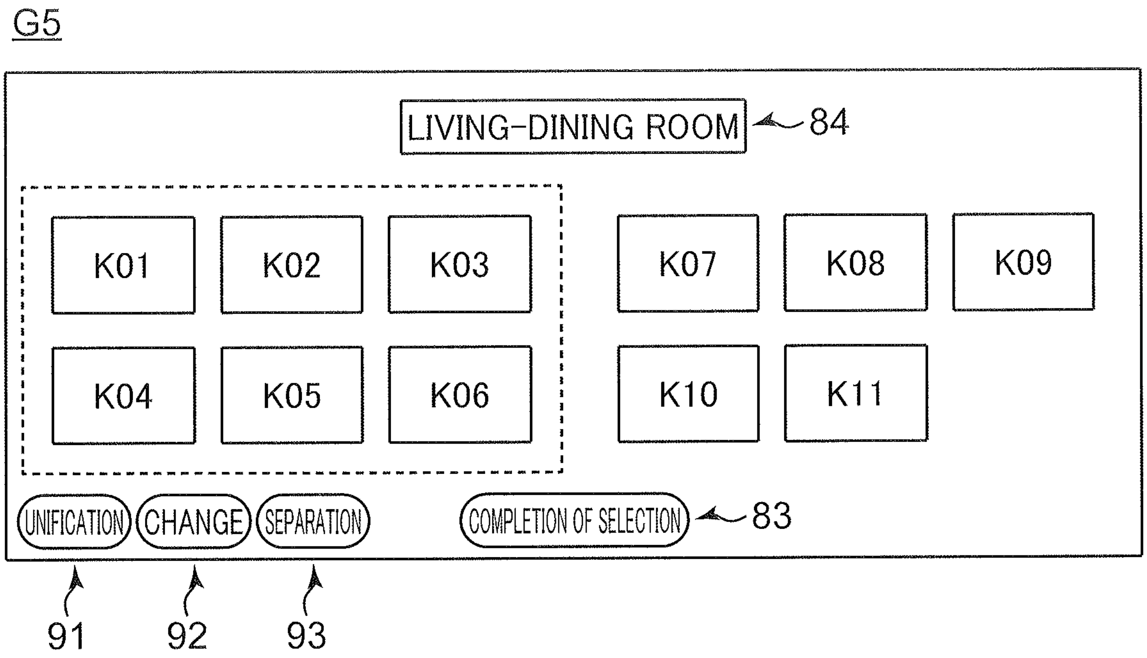
FIG. 10 is an illustration briefly showing an exemplary input screen for generating modification information for a separation.
Figure 11:
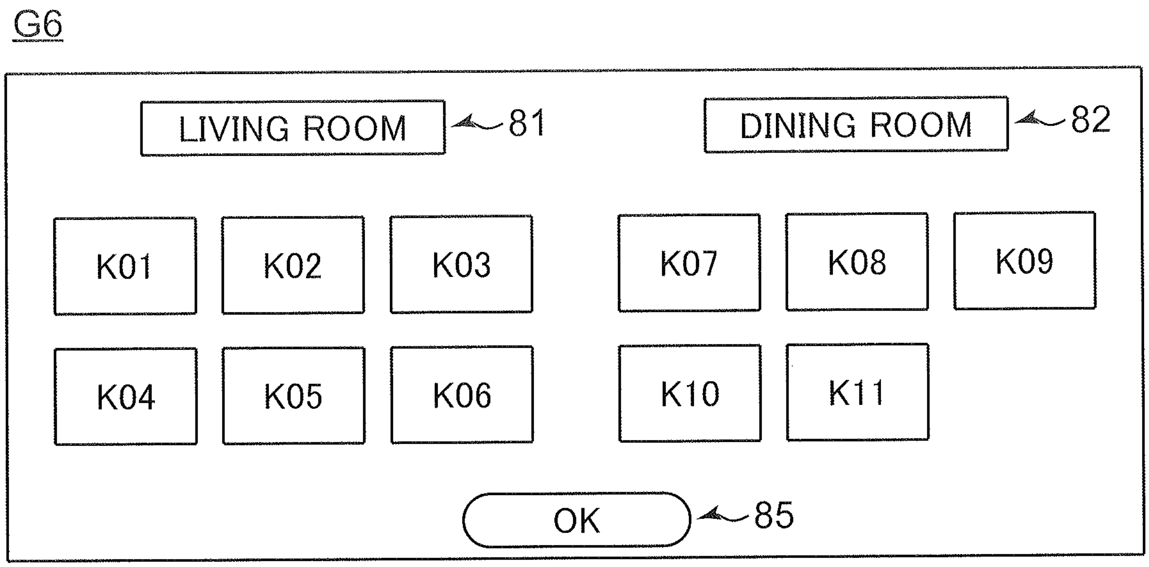
FIG. 11 is an illustration briefly showing an exemplary input screen for generating the modification information for the separation.

FIGS. 10, 11 are illustrations briefly showing exemplary input screens G5, G6 for generating the modification information for the separation, respectively. The modification part 72 of the server device 30 generates image data for the input screens G5, G6, and which is transmitted to the integral controller 10 through the communication part 40 and the communication network 20. The input screens G5, G6 are displayed on the monitor 15 of the integral controller 10. The user touches the input screens G5, G6 to thereby generate modification information.

With reference to FIG. 10, the input screen G5 shows the icons K01 to K11 indicative of the device 11 or the installation 12 associated with the living-dining room below the icon 84 indicative of the living-dining room on the basis of the first relevance information 64A.

The input screen G5 also shows the icons 83, and 91 to 93, similarly to the input screen G1 shown in FIG. 5.

After tapping the icon 93 indicative of the separation, the user selects a space (in this example, the living-dining room) to be separated and taps the icons K01 to K06 indicative of the device 11 or the installation 12 for the separation. The integral controller 10 thereby changes the display state of the icons K01 to K06 from normal display to emphasis display. When the user taps the icon 83 indicative of completion of selection, the integral controller 10 switches the input screen G5 to the input screen G6.

With reference to FIG. 11, the input screen G6 shows the icons K01 to K06 below the icon 81 indicative of the living room and the icons K07 to K11 below the icon 82 indicative of the dining room, similarly to FIG. 5. The modification part 72 or the integral controller 10 infers the name of a new space after the separation from a function or use of the device 11 or the installation 12 disposed in each space. Alternatively, the modification part 72 or the integral controller 10 may present candidates for the name of the new space and allow the user to select one. Alternatively, the modification part 72 or the integral controller 10 may allow the user to input the name of the new space by text. When the user taps the icon 85 indicative of completion of confirmation, the integral controller 10 finalizes the substance of the separation and transmits modification information indicative of the finalized substance to the server device 30 through the communication network 20. The modification information is acquired by the acquisition part 71. The modification information includes information indicative of a relevance between the name of each of the new spaces after the separation and the device 11 or the installation 12 disposed in the respective spaces.

On the basis of the modification information acquired by the acquisition part 71, the modification part 72 associates, among the device 11 or the installation 12 corresponding to the icons K01 to K11 associated with the living-dining room (first space) in the first relevance information 64A, the device 11 or the installation 12 corresponding to the icons K01 to K06 with the living room (second space) in the second relevance information 64B, and associates the device 11 or the installation 12 corresponding to the icons K07 to K11 with the dining room (third space) in the second relevance information 64B.

In the description above, the modification part 72 of the server device 30 outputs image data (image information) for displaying an image for the input screens G1 to G6 on a display screen of, e.g., the monitor 13, 15, and outputs image information for changing a display state of the device 11 or the installation 12 relevant to the modification from the normal display (first state) to the emphasis display (second state) on the display screen. The modification part 72 of the server device 30 may output control information for changing an operational state of the device 11 or the installation 12 relevant to the modification from a first state to a second state, instead of changing the display mode on the display screen. For example, the first state is one of power-on and power-off operational states of the device 11 or installation 12, and the second state is the other of the power-on and power-off operational states of the device 11 or installation 12. The control information is transmitted from the server device 30 to the device 11 or the installation 12 through the communication network 20, and the device 11 or the installation 12 changes the operational state according to the received control information. Such a change in the operational state also enables the user to visually recognize the device 11 or installation 12 relevant to the modification more accurately.

The embodiment enables an easy modification based on the modification information to the first relevance information 64A including the relevance between a space and a device 11 or an installation 12 disposed in the space while eliminating another initial setting.

Second Embodiment

Figure 12:
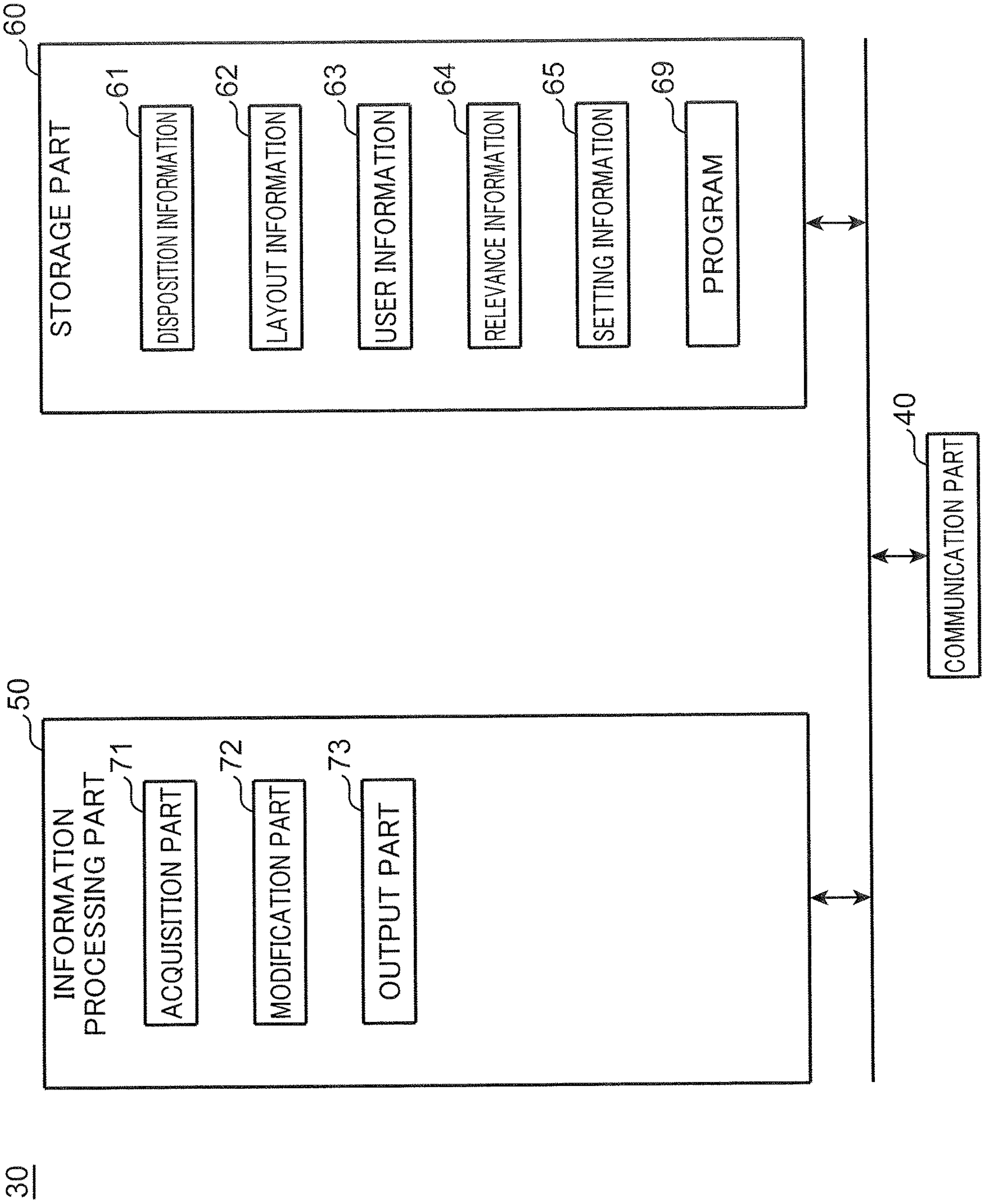
FIG. 12 is a diagram briefly showing a structure of a server device according to a second embodiment.

In the second embodiment of the present disclosure, when a modification indicated by modification information received by the server device 30 is not recommendable, a non-recommendation notification indicating that the modification is not recommendable is transmitted to the integral controller 10. FIG. 12 is a diagram briefly showing a structure of a server device 30 according to the second embodiment of the present disclosure. In addition to the configuration shown in FIG. 2, the storage part 60 further stores disposition information 61 and setting information 65. The disposition information 61 is information on where in each of the spaces defined in the smart home 100 the devices 11, the installations 12, the monitor 13, the camera 14, and the integral controller 10 are disposed, which is input beforehand by, e.g., an operator. The setting information 65 is information including preset various non-recommendation conditions under which a modification to the relevance information 64 is not recommendable, e.g., table information including an array of pieces of rule data indicative of the non-recommendation conditions.

Figure 13:
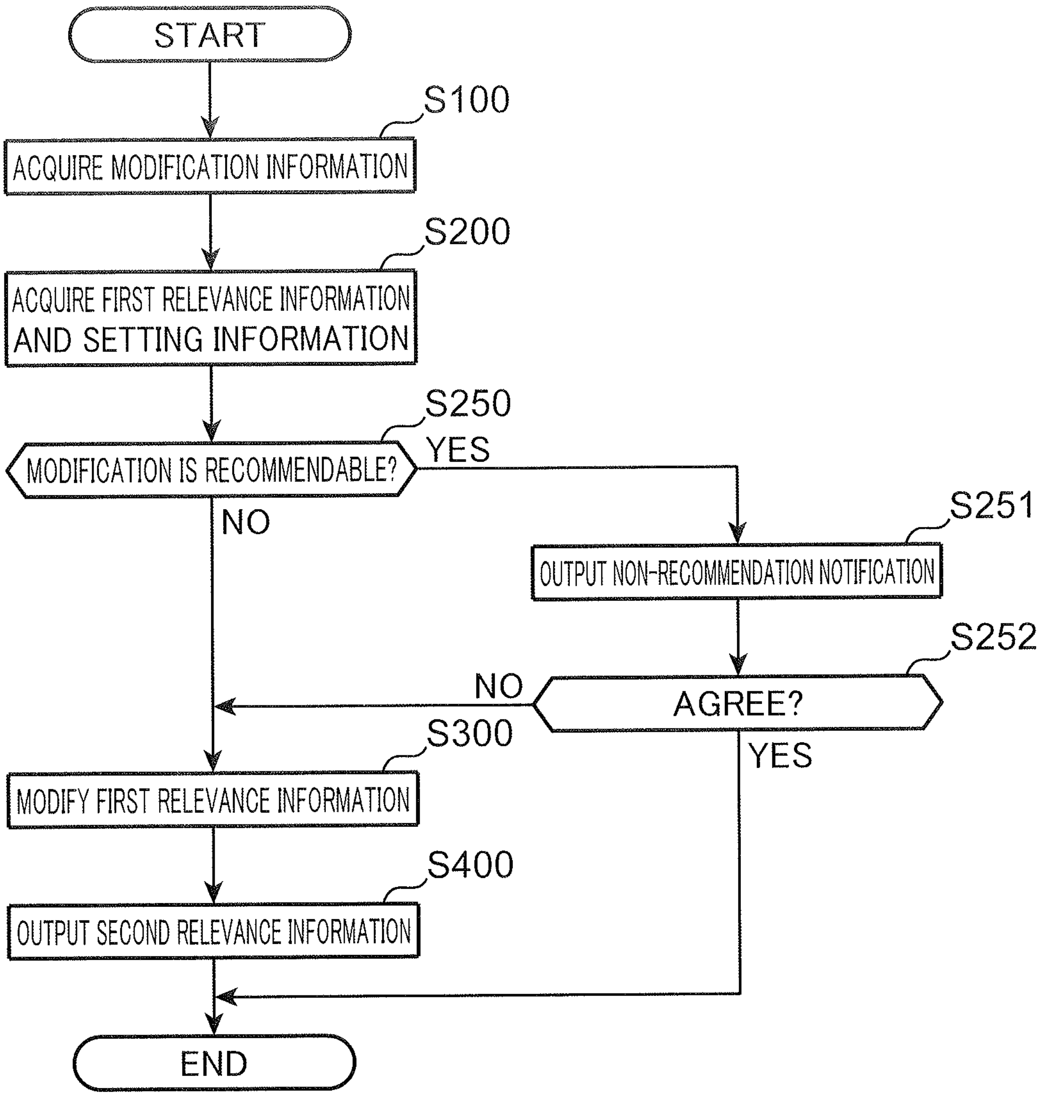
FIG. 13 is a flowchart briefly showing a flow of a process executed by an information processing part according to the second embodiment.

FIG. 13 is a flowchart briefly showing a flow of a process executed by the information processing part 50 according to the embodiment. First, in Step S100, the acquisition part 71 acquires modification information indicative of a modification to the relevance information 64 from the integral controller 10 through the communication network 20 and the communication part 40. Next, in Step S200, the acquisition part 71 acquires first relevance information 64A and setting information 65 from the storage part 60. Next, in Step S250, the modification part 72 determines on the basis of the setting information 65 whether or not the modification is unrecommendable after determination is executed as to whether or not the modification indicated by the modification information acquired by the acquisition part 71 falls under one of the non-recommendation conditions included in the setting information 65. In a case that the modification is not recommendable (YES in Step S250), then the modification part 72 generates a non-recommendation notification indicating that the modification is not recommendable and the output part 73 outputs the non-recommendation notification in Step S251. The non-recommendation notification output by the output part 73 is transmitted to the integral controller 10 through the communication part 40 of the server device 30 and the communication network 20, and is displayed on the monitor 15 of the integral controller 10.

Next, in Step S252, the modification part 72 determines on the basis of a response signal from the integral controller 10 whether or not the user has agreed not to modify the first relevance information 64A. In a case that the user has agreed not to modify the first relevance information 64A (YES in Step S252), the modification part 72 ends the process without modifying the first relevance information 64A. In a case that the modification is not unrecommendable (NO in Step S250) or a case that the user has not agreed not to modify the first relevance information 64A (NO in Step S252), the modification part 72 then modifies in Step S300 the first relevance information 64A into second relevance information 64B on the basis of the modification information acquired in Step S100. Next, in Step S400, the output part 73 outputs the second relevance information 64B. The second relevance information 64B output by the output part 73 is stored in the storage part 60, and is transmitted to the integral controller 10 through the communication part 40 and the communication network 20.

Exemplary non-recommendation conditions for the unification are as follows.

The first exemplary non-recommendation condition for the unification is that two spaces to be unified are in a symmetric structure. For example, the modification part 72 determines with reference to the disposition information 61 and the layout information 62 whether or not positions of doors, positions of lights, positions of air conditioners, and the like in respective spaces of two adjacent spaces across a partition are axisymmetric with respect to the partition. In a case that there is an axisymmetric relationship, the modification part 72 determines that the modification information on the unification of the two spaces satisfies the non-recommendation condition.

The second exemplary non-recommendation condition for the unification is that two spaces to be unified have identical devices 11 or installations 12. For example, the modification part 72 determines with reference to the first relevance information 64A whether or not devices 11 or installations 12 disposed in one space of the two spaces to be unified are identical to devices 11 or installations 12 in the other space. In a case that they are identical to each other, the modification part 72 determines that the modification information on the unification of the two spaces satisfies the non-recommendation condition.

In the first and second examples, a unification is rendered unrecommendable in a case that one large room is more likely to be separated and used as two rooms for children in the future.

The third exemplary non-recommendation condition for the unification is that the total number of devices 11 or installations 12 associated with a unified space exceeds a predetermined maximum value. The maximum value corresponds to the maximum number of icons for the devices 11 or the installations 12 simultaneously displayable on the monitor 15 without the scrolling. For example, with reference to the first relevance information 64A, the modification part 72 calculates the total number of the number of the devices 11 or the installations 12 disposed in one space to be unified and the number of the devices 11 or the installations 12 disposed in the other space, and determines whether or not the total number will exceed the maximum value. In a case that the total number exceeds the maximum value, the modification part 72 determines that the modification information on the unification of the two spaces satisfies the non-recommendation condition. The user needs to scroll in the case that the total number exceeds the maximum value, which decreases the controllability; therefore, such a unification is not recommendable. However, the user may choose to allow the modification part 72 to reduce the sizes of the icons so that all of the icons can be displayed on the monitor 15 simultaneously, in the case that the total number exceeds the maximum value.

The fourth exemplary non-recommendation condition for the unification is that the extent by a unification goes beyond a predetermined upper limit. The upper limit is, for example, "LIVING-DINING-KITCHEN (LDK)", which is predetermined. Since an additional unification of another space (e.g., an entrance, a corridor) and LDK decreases the practicability, this unification is not recommendable. For example, the modification part 72 determines with reference to the first relevance information 64A whether or not the extent of a new space after a unification of a plurality of spaces to be unified will go beyond the upper limit. In a case that the extent of the new space goes beyond the upper limit, the modification part 72 determines that the modification information on the unification of the spaces satisfies the non-recommendation condition. In this regard, the modification part 72 may determine that a unification is not recommendable in a case that the number of spaces to be unified exceeds a predetermined maximum value (e.g., 3).

The fifth exemplary non-recommendation condition for the unification is that the total communication load by the devices 11 or the installations 12 associated with a unified space exceeds a predetermined maximum load. Since an excess of the total communication load over the maximum load causes a delay in a remote control of a device 11 or an installation 12 and a decrease in the controllability, this unification is not recommendable. For example, the first relevance information 64A additionally has information indicative of a communication load by each of the devices 11 or the installations 12. The modification part 72 determines with reference to the first relevance information 64A whether or not the total communication load by the devices 11 or the installations 12 associated with a new space after a unification of a plurality of spaces to be unified will exceed the maximum load. In a case that the total communication load exceeds the maximum load, the modification part 72 determines that the modification information on the unification of the spaces satisfies the non-recommendation condition.

Exemplary non-recommendation conditions for the change are as follows.

The first exemplary non-recommendation condition for the change is that a device 11 or an installation 12 is shifted from a higher room to a lower room in terms of number of times of use of a room tab on a control screen of the integral controller 10, that is, from a room having a higher number of times of use of the room tab to a room having a lower number of times of use of the room tab. For example, the modification part 72 counts and records the number of times of use of the room tab for each room from the start of operation of the system to the present. In a case that the number of times of use of the room tab for the shifted-in room is less than the number of times of use of the room tab for the shifted-out room, the modification part 72 determines that the modification information on the change satisfies the non-recommendation condition.

The second exemplary non-recommendation condition for the change is that there is a user who takes control on a device 11 or an installation 12 through the integral controller 10 more times than the user who has input the modification information. For example, the modification part 72 counts the number of times of control over the integral controller 10 from the start of operation of the system to the present and records it as additional information to the user information 63. In a case that there is any other user who takes control more times than the user who has input the modification information, the modification part 72 determines that the modification information satisfies the non-recommendation condition. The modification part 72 can specify the user controlling the integral controller 10 by login information, if including user information, or by analysis on a captured image by the camera 14. The user information included in the login information has, e.g., biological information such as voiceprint information and fingerprint information, or a user ID used for a login. Use of user information associated with an individual as the login information enables every person of a family to control the integral controller 10 separately even when the persons of the family share the integral controller 10.

Exemplary non-recommendation conditions for the separation are as follows.

The first exemplary non-recommendation condition for the separation is that the total number of the devices 11 or the installations 12 to be associated with a space after a separation is less than a predetermined minimum value. For example, the modification part 72 calculates the total number of the devices 11 or the installations 12 to be associated with each space after the separation with reference to the first relevance information 64A, and determines whether or not the total number for each space is less than the minimum value. In a case that there is a space for which the total number is less than the minimum value, the modification part 72 determines that the modification information satisfies the non-recommendation condition.

The second exemplary non-recommendation condition for the separation is that a plurality of spaces across which a device 11 or an installation 12 is disposed is about to be divided. For example, one room has a switch and the other room has a light or an air conditioner that is controlled by the switch. For example, the modification part 72 determines with reference to the disposition information 61 and the layout information 62 whether or not a device 11 or an installation 12 disposed in one of two spaces after the separation and a device 11 or an installation 12 disposed in the other space are connected with each other by a wire or the like. In a case that such an interconnection is formed by a wire or the like, the modification part 72 determines that the modification information satisfies the non-recommendation condition.

A transmission by the communication part 40 to the integral controller 10 of the non-recommendation notification output by the output part 73 enables a notification to the user that a modification is undesirable.

In the description above, the server device 30 outputs a non-recommendation notification when a modification to the first relevance information 64A is not recommendable, but alternatively or additionally, may transmit a recommendation notification indicative of a recommendable modification to the first relevance information 64A to the integral controller 10 at a time of the acquisition of the modification information in Step S100 or other time. In this case, the setting information 65 includes various recommendation conditions under which a modification to the relevance information 64 is recommendable and information indicative of a recommendable modification under each of the recommendation conditions.

An exemplary recommendation condition for the unification is as follows.

One example is that the total number of the devices 11 or the installations 12 associated with a space before a unification is less than a predetermined minimum value. For example, the modification part 72 determines with reference to the first relevance information 64A whether or not the total number of the devices 11 or the installations 12 associated with each space is less than the minimum value. In a case that there is a space for which the total number is less than the minimum value, the modification part 72 generates a recommendation notification concerning recommendation of a unification of the space and an adjacent space. The adjacent space to be unified may be preset for each space. The output part 73 outputs the recommendation notification generated by the modification part 72. The recommendation notification output by the output part 73 is transmitted to the integral controller 10 through the communication part 40 and the communication network 20.

Exemplary recommendation conditions for the change are as follows.

The first exemplary recommendation condition for the change is that the difference between the number of devices 11 or installations 12 associated with one of adjacent spaces and the number of devices 11 or installations 12 associated with another of the adjacent spaces is not less than a predetermined value. In this case, the modification part 72 generates a recommendation notification concerning recommendation of a shift from a space with a higher number to a space with a lower number. For example, with reference to the first relevance information 64A, the modification part 72 compares the total number of the devices 11 or the installations 12 disposed in one space which is under the change and the total number of the devices 11 or the installations 12 disposed in another space which is under the change. In a case that the difference between the total numbers is not less than the predetermined value, the modification part 72 generates a recommendation notification concerning recommendation of a shift of a device 11 or an installation 12 from the space with a higher number to the space with a lower number.

The second exemplary recommendation condition for the change is that a plurality of devices 11 or installations 12 that is operated consecutively in a series of operations is associated with different spaces. For example, operational history information, which includes operational information on each of the devices 11 or the installations 12 chronologically, is stored in the storage part 60. The modification part 72 specifies a plurality of devices 11 or installations 12 that is operated consecutively within a certain time in a series of operations by analysis on the operational history information. In a case that the specified devices 11 or installations 12 are associated with different spaces in the first relevance information 64A, the modification part 72 generates a recommendation notification concerning recommendation of a change of the association between the devices 11 or the installations 12 and the spaces such that the devices 11 or the installations 12 are associated with an identical space in the second relevance information 64B.

Exemplary recommendation conditions for the separation are as follows.

The first exemplary recommendation condition for the separation is that the total number of devices 11 or installations 12 associated with a space before a separation exceeds a predetermined maximum value. For example, the modification part 72 determines with reference to the first relevance information 64A whether or not there is a space for which the total number of the disposed devices 11 or installations 12 exceeds the maximum value. In a case that there exists such a space, the modification part 72 generates a recommendation notification concerning recommendation of separating the space into a plurality of spaces. It may be appreciated to set a separation form for each space in advance.

The second exemplary recommendation condition for the separation is that a space before a separation has a plurality of symmetric space structures. For example, the modification part 72 determines with reference to the disposition information 61 and the layout information 62 whether or not a space has a plurality of space structures where positions of doors, positions of lights, positions of air conditioners, and the like are axisymmetric with respect to a partition. In a case that there exists such a space, the modification part 72 generates a recommendation notification concerning recommendation of separating the space into a plurality of spaces corresponding to the space structures.

The third exemplary recommendation condition for the separation is that a space before a separation has a plurality of spaces provided with identical devices 11 or installations 12. For example, the modification part 72 determines with reference to the disposition information 61 and the layout information 62 whether or not a space has a plurality of spaces provided with identical devices 11 or installations 12. In a case that there exists such a space, the modification part 72 generates a recommendation notification concerning recommendation of separating the space into the plurality of spaces.

A transmission by the communication part 40 to the integral controller 10 of the recommendation notification output by the output part 73 enables a notification of a desirable modification to the user.

Third Embodiment

In the third embodiment of the present disclosure, a confirmation notice to the user as to whether or not to modify the first relevance information 64A is transmitted to the integral controller 10 when the server device 30 receives the modification information. Also in the embodiment, the storage part 60 stores setting information 65, similarly to the second embodiment. The setting information 65 in the embodiment is information including various preset conditions for transmission of a confirmation notice, e.g., table information including an array of pieces of rule data indicative of the transmission conditions.

Figure 14:
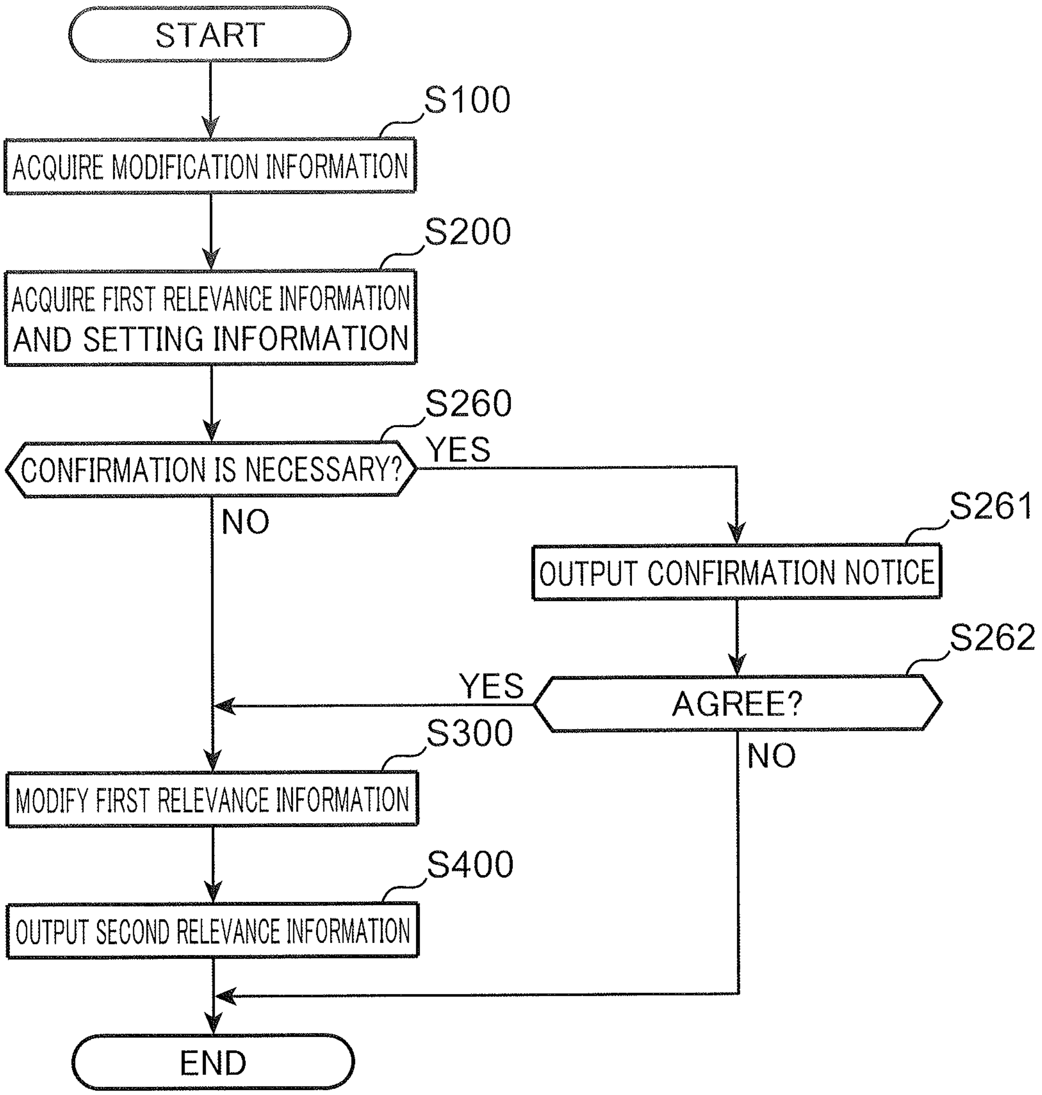
FIG. 14 is a flowchart briefly showing a flow of a process executed by an information processing part according to a third embodiment.

FIG. 14 is a flowchart briefly showing a flow of a process executed by an information processing part 50 according to the third embodiment of the present disclosure. First, in Step S100, the acquisition part 71 acquires modification information indicative of a modification to the relevance information 64 from the integral controller 10 through the communication network 20 and the communication part 40. Next, in Step S200, the acquisition part 71 acquires first relevance information 64A and setting information 65 from the storage part 60. Next, in Step S260, the modification part 72 determines on the basis of the setting information 65 whether or not it is necessary to transmit a confirmation notice to the user after determination is executed as to whether or not at least one of the transmission conditions included in the setting information 65 is fulfilled. In a case that it is necessary to transmit a confirmation notice (YES in Step S260), then the modification part 72 generates a confirmation notice and the output part 73 outputs the confirmation notice in Step S261. The confirmation notice output by the output part 73 is transmitted to the integral controller 10 through the communication part 40 of the server device 30 and the communication network 20, and is displayed on the monitor 15 of the integral controller 10.

Next, in Step S262, the modification part 72 determines on the basis of a response signal from the integral controller 10 whether or not the user has agreed to modify the first relevance information 64A. In a case that the user has not agreed to modify the first relevance information 64A (NO in Step S262), the modification part 72 ends the process without modifying the first relevance information 64A. In a case that it is not necessary to transmit a confirmation notice (NO in Step S260) or a case that the user has agreed to modify the first relevance information 64A (YES in Step S262), the modification part 72 then modifies in Step S300 the first relevance information 64A into second relevance information 64B on the basis of the modification information acquired in Step S100. Next, in Step S400, the output part 73 outputs the second relevance information 64B. The second relevance information 64B output by the output part 73 is stored in the storage part 60, and is transmitted to the integral controller 10 through the communication part 40 and the communication network 20.

Exemplary conditions for transmission of a confirmation notice are as follows.

The first example is that a time difference between a time of the acquisition of the modification information and a time when the first relevance information 64A was previously modified is less than a predetermined value. For example, the modification part 72 keeps time information indicative of a time when the first relevance information 64A was previously modified. The modification part 72 calculates a time difference between a time of the acquisition of the modification information in Step S100 and the time when the first relevance information 64A was previously modified, and determines that a condition for transmission of a confirmation notice is fulfilled in a case that the time difference is less than the predetermined value. The predetermined value is set in an hourly unit, e.g., "three hours", or may be set in a daily unit, e.g., "one day".

The second example is that the user that previously input modification information is different from the user currently inputting modification information. For example, the modification part 72 keeps user information indicative of a user that has previously modified the first relevance information 64A (i.e., the user that previously input modification information). Further, the integral controller 10 transmits to the server device 30 modification information with user information indicative of the user that has input the modification information. The modification part 72 determines whether the user indicated by the user information included in the modification information acquired in Step S100 is different from or identical to the user that has previously modified the first relevance information 64A, and determines that a condition for transmission of a confirmation notice is fulfilled in a case that the users are different from each other. The integral controller 10 or the modification part 72 can specify the user that has input the modification information by login information, if including user information, or by analysis on a captured image by the camera 14.

The third example is that there is a user who has a higher frequency in use of the integral controller 10 than a user inputting the modification information. For example, the modification part 72 receives from the integral controller 10 and keeps frequency information indicative of frequency for each user in use of the integral controller 10 in connection with the first relevance information 64A (e.g., frequency in execution of remote control by use of an icon). Further, the integral controller 10 transmits to the server device 30 modification information with user information indicative of the user that has input the modification information. The modification part 72 determines whether or not there is another user that has a higher use frequency than the user indicated by the user information included in the modification information acquired in Step S100, and determines that a condition for transmission of a confirmation notice is fulfilled in a case that there exists such another user. In a case that users with a high use frequency change from one to another according to time zones, the modification part 72 determines the user with the highest use frequency in each time zone. An individual control screen (user interface) may be set for each user; in this case, it is preferable that the respective control screens for the users are displayed on respective control terminals (e.g., smartphone) of the users.

The embodiment can resolve the discrepancy in the settings between, e.g., a plurality of users living together in the same house.

INDUSTRIAL APPLICABILITY

The present disclosure is useful especially when applied to a home control system for use in a smart home with IoT technology.

EXPLANATION OF REFERENCE NUMERALS

10 integral controller
30 server device
11 device
12 installation
50 information processing part
64 relevance information
65 setting information
69 program
71 acquisition part
72 modification part
73 output part

The invention claimed is:

1. An information output method, by an information processing apparatus, comprising:

acquiring first relevance information indicative of a relevance between space identification information identifying a space in a building and device-installation information that is indicative of a device or an installation and associated with the space identification information;

acquiring modification information for modifying an association between the space identification information and the device-installation information in the first relevance information;

generating second relevance information indicative of a new association between the space identification information and the device-installation information on the basis of the modification information, wherein the modification information concerns a unification of two or more pieces of space identification information included in the first relevance information into one piece of space identification information, and in the generation of the second relevance information, first device-installation information associated with first space identification information in the first relevance information and second device-installation information associated with second space identification information in the first relevance information are associated with third space identification information in the second relevance information; and outputting control information for changing an operational state of at least one of the device or the installation relevant to the modification information between a first state in which it is not operating and a second state in which it is operating.

2. An information output method, by an information processing apparatus, comprising:

acquiring first relevance information indicative of a relevance between space identification information identifying a space in a building and device-installation information that is indicative of a device or an installation and associated with the space identification information;

acquiring modification information for modifying an association between the space identification information and the device-installation information in the first relevance information;

generating second relevance information indicative of a new association between the space identification information and the device-installation information on the basis of the modification information, wherein the modification information concerns a change of an association of the device-installation information with from one space identification information to another space identification information in the first relevance information, and in the generation of the second relevance information, first space identification information associated with first device-installation information in the first relevance information is associated with second space identification information in the second relevance information; and outputting control information for changing an operational state of at least one of the device or the installation relevant to the modification information between a first state in which it is not operating and a second state in which it is operating.

3. An information output method, by an information processing apparatus, comprising:

acquiring first relevance information indicative of a relevance between space identification information identifying a space in a building and device-installation information that is indicative of a device or an installation and associated with the space identification information;

acquiring modification information for modifying an association between the space identification information and the device-installation information in the first relevance information;

generating second relevance information indicative of a new association between the space identification information and the device-installation information on the basis of the modification information, wherein the modification information concerns a separation of one piece of space identification information included in the first relevance information into a plurality of pieces of space identification information, and in the generation of the second relevance information, first device-installation information and second device-installation information associated with first space identification information in the first relevance information are associated with second space identification information and third space identification information in the second relevance information, respectively; and outputting control information for changing an operational state of at least one of the device or the installation relevant to the modification information between a first state in which it is not operating and a second state in which it is operating.

4. The information output method according to claim 1, further comprising:

outputting image information for displaying an image on a display screen, wherein in the output of the image information, the image information for changing a display state of device-installation information relevant to the modification information from a first state to a second state on the display screen is output.

5. The information output method according to claim 4, wherein the first state is a normal display state of a graphic representing the device-installation information, and the second state is an emphasis display state of the graphic representing the device-installation information.

6. The information output method according to claim 1, wherein the first state is one of power-on and power-off operational states of the device or installation, and the second state is the other of the power-on and power-off operational states of the device or installation.

7. The information output method according to claim 1, further comprising:

outputting a recommendation notification indicative of a recommendable modification to the first relevance information when acquiring the modification information.

8. The information output method according to claim 1, further comprising:

outputting a non-recommendation notification indicating that the modification information is not recommendable, when the modification information is acquired and a modification is not recommendable.

9. The information output method according to claim 1, wherein time information indicative of a time when the first relevance information was previously modified is kept, and in a case that a time difference between a time of the acquisition of the modification information and the time when the first relevance information was previously modified is less than a predetermined value, a confirmation notice as to whether or not to modify the first relevance information is further output.

10. The information output method according to claim 1, wherein user information indicative of a user that previously modified the first relevance information is kept, and in a case that a user currently inputting the modification information is different from the user that previously modified the first relevance information, a confirmation notice as to whether or not to modify the first relevance information is further output.

11. The information output method according to claim 1, wherein frequency information indicative of use frequency for each user in connection with the first relevance information is kept, and in a case that there is a user who has a higher use frequency than a user inputting the modification information, a confirmation notice as to whether or not to modify the first relevance information is further output.

12. A non-transitory computer-readable recording medium recording a program causing an information processing apparatus to serve as:

acquisition means for acquiring first relevance information indicative of a relevance between space identification information identifying a space in a building and device-installation information that is indicative of a device or an installation and associated with the space identification information, and modification information for modifying an association between the space identification information and the device-installation information in the first relevance information;

generation means for generating second relevance information indicative of a new association between the space identification information and the device-installation information on the basis of the modification information and, wherein the modification information concerns a unification of two or more pieces of space identification information included in the first relevance information into one piece of space identification information, and in the generation of the second relevance information, first device-installation information associated with first space identification information in the first relevance information and second device-installation information associated with second space identification information in the first relevance information are associated with third space identification information in the second relevance information; and the information processing apparatus is further caused to serve as output means for outputting control information for changing an operational state of at least one of the device or the installation relevant to the modification information between a first state in which it is not operating and a second state in which it is operating.

* * * * *